United States Patent
Breyman et al.

(10) Patent No.: US 7,107,266 B1
(45) Date of Patent: Sep. 12, 2006

(54) METHOD AND APPARATUS FOR AUDITING TRAINING SUPERSETS

(75) Inventors: Clark Leonard Breyman, San Francisco, CA (US); Mark W. Davis, Tracy, CA (US)

(73) Assignee: Inxight Software, Inc., Sunnyvale, CA (US)

( * ) Notice: Subject to any disclaimer, the term of this patent is extended or adjusted under 35 U.S.C. 154(b) by 417 days.

(21) Appl. No.: 10/044,711

(22) Filed: Oct. 24, 2001

Related U.S. Application Data

(60) Provisional application No. 60/246,752, filed on Nov. 9, 2000.

(51) Int. Cl.
*G06F 17/30* (2006.01)
*G06F 7/00* (2006.01)

(52) U.S. Cl. ............................................. 707/6; 707/5
(58) Field of Classification Search ................ 704/245; 706/12, 20, 21, 2; 707/5, 6
See application file for complete search history.

(56) References Cited

U.S. PATENT DOCUMENTS

| | | | | |
|---|---|---|---|---|
| 5,251,131 A | * | 10/1993 | Masand et al. ................ | 704/9 |
| 5,537,488 A | * | 7/1996 | Menon et al. .............. | 382/170 |
| 6,003,027 A | * | 12/1999 | Prager ........................... | 707/5 |
| 6,301,579 B1 | * | 10/2001 | Becker ....................... | 707/102 |
| 6,324,531 B1 | * | 11/2001 | Anderson et al. ............. | 706/15 |
| 6,405,195 B1 | * | 6/2002 | Ahlberg ......................... | 707/4 |
| 6,643,629 B1 | * | 11/2003 | Ramaswamy et al. ........ | 706/45 |
| 6,789,070 B1 | * | 9/2004 | Willett et al. ................. | 706/20 |

OTHER PUBLICATIONS

Yang, Yiming et al., "A re-examination of text categorization methods," Proceedings of ACM SIGIR Conference on Research and Development in Information Retrieval (SIGIR'99) 1999:42-49.
Yang, Yiming, "Expert Network: Effective and efficient learning from human decisions in text categorization and retrieval," Proceedings of the 17th Annual International ACM SIGIR Conference on Research and Development in Information Retrieval (SIGIR'94) 1994:11-21.
Yang, Yiming, "An Evaluation of Statistical Approaches to Text Categorization," Journal of Information Retrieval, vol. 1, No. 1/2 (1999) 67-88.
Yamanishi, Kenji, et al., "On-line Unsupervised Outlier Detection Using Finite Mixtures with Discounting Learning Algorithms," ACM Press, New York, NY (2000) ISBN:1-58113-233-6, 320-324.
Cox, Trevor F., et al., "A Conditioned Distance Ratio Method for Analyzing Spatial Patterns," Biometrika, vol. 63, Issue 3 (Dec. 1976), 483-491.
Ankerst, Mihael, et al., "Towards an Effective Cooperation of the User and the Computer for Claasification," ACM Conference on Knowledge Discovery in Data, Proceedings Sixth ACM SIGKDD International Conference on Knowledge Discovery and Data Mining, Aug. 20-23, 2000, Boston, MA USA, 179-188.
Theodoridis, Sergios et al., Pattern Recognition by S. Thoedoridis and K. Koutroumbas (1999), Academic Press, Chapter 16, "Cluster Validity," 543-591.

* cited by examiner

*Primary Examiner*—Uyen Le
*Assistant Examiner*—Cheryl M Fernandes
(74) *Attorney, Agent, or Firm*—Ernest J. Beffel, Jr.; Haynes Beffel & Wolfeld LLP

(57) ABSTRACT

The present invention includes methods and systems to audit and identify potential errors and/or omissions in a training set. Particular aspects of the present invention are described in the claims, specification and drawings.

34 Claims, 3 Drawing Sheets

(F1, F2, F3, ... Fn-1, Fn)
211

METHOD AND APPARATUS FOR AUDITING TRAINING SUPERSETS

RELATED APPLICATION INFORMATION

This application claims the benefit of and priority provisional Application No. 60/246,752, filed 9 Nov. 2000, entitled Methods and Systems for Categorizing Information, by these same Inventors Clark Breyman and Mark Davis, which application is hereby incorporated by reference.

BACKGROUND OF THE INVENTION

Training sets are used in automatic categorization of documents, to establish precision and recall curves and to train automatic categorization engines to categorize documents correctly. Precision and recall curves are standard measures of effective categorization and information retrieval. Precision is a measure of the proportion of documents retrieved that are relevant to the intended result. Recall is a measure of the coverage of a query, for instance the number of documents retrieved that match an intended result, compared to the number of documents available that match the intended result. Precision and recall curves generated from a training set are used to set criteria for automatically assigning documents to categories. The training set typically includes documents with categories that have been editorially established or verified by a human.

Errors in categorization include failure to assign a document to the category in which it belongs and assignment of the document to a category in which it does not belong. One cause of failure to assign a document is so-called inadequate corroborative evidence of the correct categorization by sufficiently similar documents. In other words, the training set does not include enough sufficiently similar documents to train a system to produce the desired match. An approach to overcoming inadequate corroborative evidence is to add documents to the training set. One cause of assignment of a document to the wrong category is erroneous categorization examples. Human editors, however careful, can make mistakes when preparing training documents for a categorization model. Sometimes, a document is marked with an incorrect code. Experience shows that many human errors are errors of omission, in which one or more topic codes relevant to the document have been omitted or forgotten. Examples of errors and/or omissions in training set formulation include: (a) the incorrect association between a specific sample document and a category or a controlled vocabulary code, (b) the absence of a correct association between a specific sample document and a category, and (c) the absence of a sufficient number of similar sample documents whose coding would corroborate the coding of a document to be coded.

Categorization-by-example systems tend to propagate, and in some cases amplify, errors in the training set. Accordingly, an opportunity arises to introduce methods and systems to audit training sets and automatically identify sample documents whose coding appears to be inconsistent with other coding of the training set.

SUMMARY OF THE INVENTION

The present invention includes methods and systems to audit and identify potential errors and/or omissions in the training set. Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
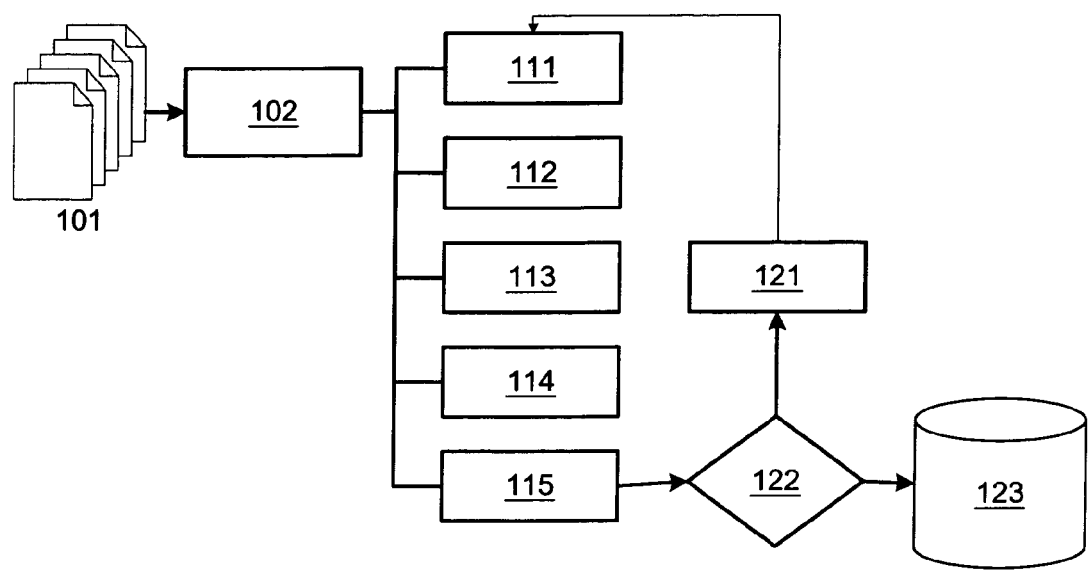
FIG. 1 is a block diagram of creating an initial set of documents.

FIG. 1 is a block diagram of creating an initial set of documents. In the context of this invention, a document generically may include text, images, recordings, and other data sets. Text documents may include visual formatting information, as in HTML, RTF, typeset or other formats, or they may not. Uncoded documents 101 are loaded and registered 102 into a workfile. A user or system codes the documents to create a training set. The user may begin with a set of topics and add or delete topics 111 to or from the topic taxonomy. Individual documents can have topic assignments added or removed 112. New documents can be added or deleted 113, to supplement or reduce the uncoded documents set 101. Nearest neighbor and similarity measures can be generated 114. Precision and accuracy curves can be generated, reviewed and acted upon 115. The user may chose 121, after setting or verifying the thresholds for categorization, to refine the training set workfile 122 or to save the workfile as a training set 123.

Figure 2:
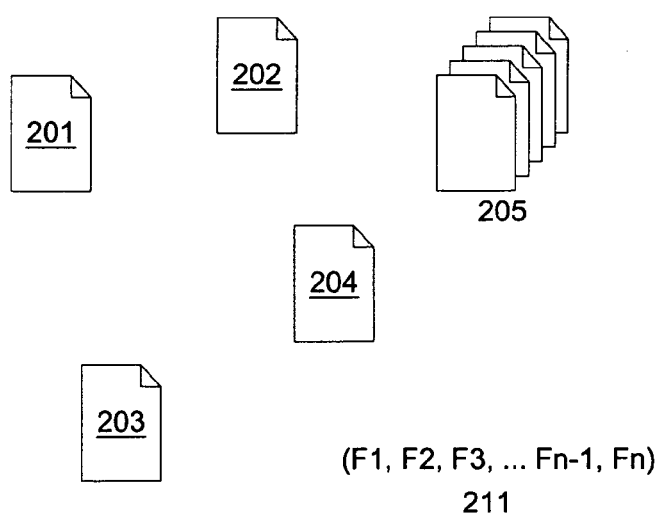
FIG. 2 depicts determination of similarity among documents.

FIG. 2 depicts determination of similarity among documents. Much has been written about nearest neighbor algorithms. One of ordinary skill in the art will understand organizing items of data in accordance with their nearest neighbors and calculating similarity values. In FIG. 2, document 201 can be represented by a feature vector 211. For a text document, the feature vector 211 may have entries corresponding to words appearing in the document. This feature vector may identify words or phrases as appearing or not appearing, or it may indicate the frequency with which a word appears in document 201. For a recording of spoken language, the feature vector may be based on morphemes, phonemes, formants, or larger or smaller units of sound. For an image or sound recording, the feature vector may identify the size of the image or recording and the spectral content of one or more regions or segments of the data. For a fingerprinted document, the feature vector may include characteristics of the fingerprint.

In FIG. 2, the three nearest neighbors of document 201 are documents 202, 203 and 204. The documents in set 205 are more distant from or less similar to document 201. Measures of distance or similarity discussed in the literature include coordinate matching, inner product similarity, relative term frequency measures, including term frequency/inverse document frequency (TF/IDF) measures, a cosine measure of the angle between n-dimensional vectors and other scalar representations. See, Witten, I. H, Moffat, A and Bell, T. C., Managing Gigabytes (2d Ed.), pp. 180–188 (Morgan Kaufmann Pub. 1999); Baeza-Yates, R and Ribeiro-Neto, B, Modern Information Retrieval, pp. 19–71 (Addison Wesley 1999). Outlier identification, which is an aspect of the present invention, can be used with any measure of similarity, either scalar or multi-dimensional. Lists of nearest neighbors of a document such as 201 can include a pre-selected number of "k" nearest neighbors, all neighbors satisfying a similarity threshold, or even all neighbors in the entire set. Reasonably short lists are easier to process for many purposes and easier to update.

Figure 3:
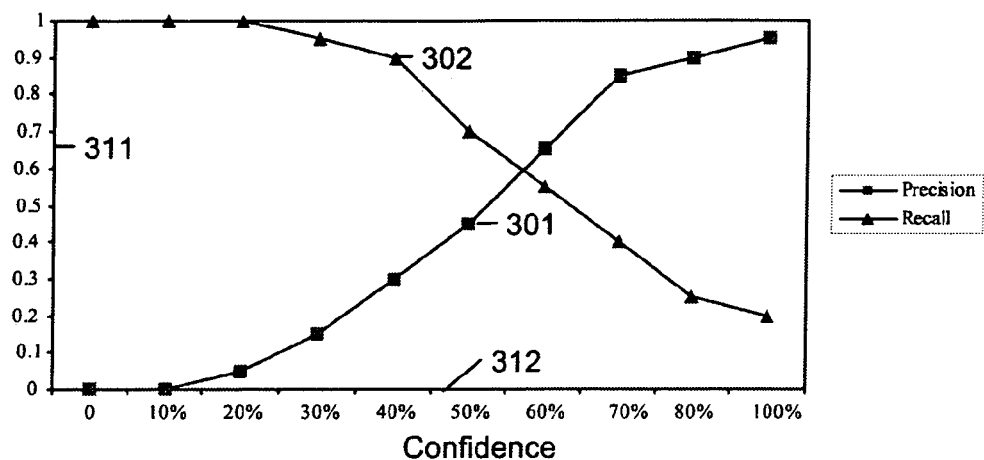
FIG. 3 depicts a pair of precision and recall curves.

FIG. 3 depicts a pair of precision and recall curves. Precision is standard measure of information retrieval performance. It is defined as the number of relevant documents retrieved divided by the total number of documents retrieved. For example, suppose that there are 80 documents relevant to widgets in the collection A retrieval system returns 60 documents, 40 of which are about widgets. The system's precision is 40/60=67 percent. In an ideal world, precision is 100 percent. Since this is easy to achieve (by returning just one document,) the system attempts to maximize both precision and recall simultaneously. Recall, again, is defined as the number of relevant documents retrieved divided by the total number of relevant documents in the collection. For example, suppose that there are 80 documents relevant to widgets in the collection. The system returns 60 documents, 40 of which are about widgets. Then the system's recall is 40/80=50 percent. In an ideal world, recall is 100 percent. Like perfect precision, perfect recall is trivial to achieve (by retrieving all of the documents.) Thus, it is important to measure system performance by both precision and recall. One standard way of plotting precision and recall curves is to determine thresholds that recall 0, 10, 20 . . . 100 percent of the relevant documents in the collection. The recall curve 302 is plotted at such varying degrees of recall, expressed as a percentage 312. At these thresholds for recall, the precision score 311 is also calculated, expressed as a fraction 311. A precision curve 301 is juxtaposed on the same graph. This pair of curves illustrates that as recall increases, precision tends to drop. The two are inversely related, but not precisely related. The choice of appropriate parameters or thresholds to trade-off precision and recall depends on the shape of precision and recall curves for a particular topic and the preferences of the user community.

Figure 4:
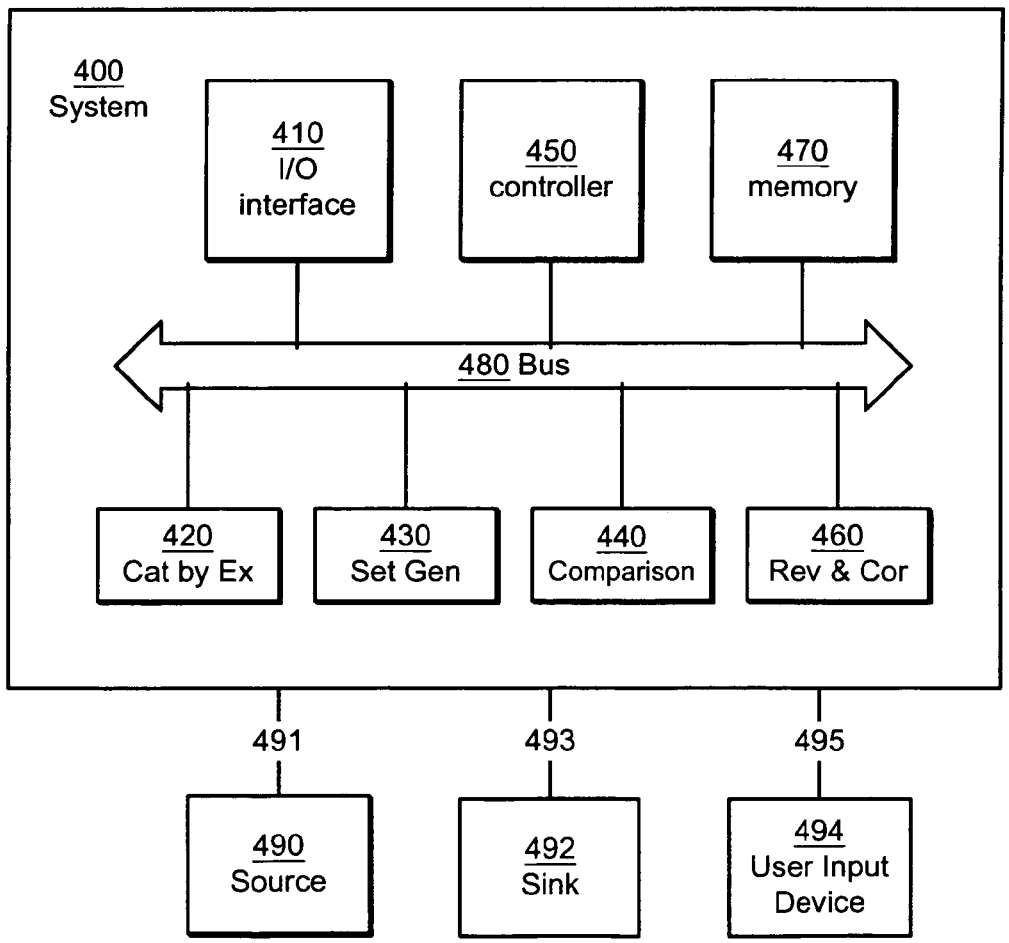
FIG. 4 is a block diagram of an information categorization system.

FIG. 4 is a block diagram of an information categorization system 400 practicing aspects of this invention. One system includes an input/output interface 410, a categorization-by-example subsystem 420, a sample-test training set generation subsystem 430, a comparison subsystem 440, a controller 450, a review/correction subsystem 460, and a memory 470, all of which are electrically and/or functionally interconnected by a data/control bus 480.

A data source 490, a data sink 492 and an input device 494 may be connected to the data organization system 400 by links 491, 493 and 495, respectively. The data source 490 can be a locally or remotely located computer or database, or any other known or later developed device that is capable of generating electronic data. Similarly, the data source 490 can be any suitable device that stores and/or transmits electronic data, such as a client or a server of a network. The data source 490 can alternatively be a storage medium such as a magnetic or optical disk that is accessed by a suitable device located within or externally of the data organization system 400. The data source 490 can be connected to the data organization system 400 over a connection device, such as a modem, a local area network, a wide area network, an intranet, the Internet, any other distributed processing network, or any other known or later-developed connection device.

It should also be appreciated that, while the electronic data can be generated just prior to, or even while, being organized by the categorization system 400, the electronic data could have been generated at any time in the past. The data source 490 is thus any known or later-developed device that is capable of supplying electronic data over the link 491 to the categorization system 400. The link 491 can thus be any known or later-developed system or device for transmitting the electronic data from the data source 490 to the categorization system 400.

The data sink 492 can be any known or later-developed system capable of receiving the electronic data organized by categorization system 400 over the link 493 and displaying the organized data. For example, the data sink 492 can be a computer or television monitor, a marking engine or the like, or can be a device, such as a magnetic or optical storage disk, a computer memory, or the like, for storing the organized data for later display. The link 493 can be any known or later-developed system or device for transmitting the electronic data from the data sink 492 to the categorization system 400.

The input device 494 can be any known or later-developed system that allows a user to input command information into the data organization system 400. For example, the input device can include one or more of a keyboard, a mouse, a track ball, a touch pad, a touch screen, a voice recognition-based input system, and the like. The link 495 connecting the input device 494 to the data organization system 400 can be any known or later-developed system or device for transmitting the electronic data from the input device 494 to the data organization system 400.

Any or all of the links 491, 493 and 495 can be a direct link, such as one or more electric and/or optical cables. Any or all of the links 491, 493 and 495 can also be a local area network, a wide area network, the Internet, an intranet, or any other distributed processing and storage network. Moreover, any or all of the links 491, 493 and 495 can also be or include a wireless link.

Other configurations of the elements shown in FIG. 4 may be used without departing from the spirit and scope of this invention. For example, the categorization system 400 is shown in FIG. 4 using bus architecture when any other architecture may be used, as is well-known in the art.

It should be understood that the systems and subsystems shown in FIG. 4 can be implemented as portions of a suitably programmed general purpose computer. Alternatively, the systems shown in FIG. 4 can be implemented as integrated or physically distinct hardware circuits within an ASIC, or using a FPGA, a PDL, a PLA or a PAL, or using discrete logic elements or discrete circuit elements. The particular form of the systems shown in FIG. 4 will take is a design choice and will be obvious and predictable to those skilled in the art.

Furthermore, one or more of the systems shown within the categorization subsystem 420 in FIG. 4 may be provided externally of the categorization system 400 and operate as needed in conjunction with the other systems via the input/output interface 491. Moreover, either or both of the data source 490 and the data sink 492 may be provided as an integral part of the categorization system 400 and connected directly to the data/control bus 480.

The categorization-by-example system 420 codes data samples. The categorization-by-example subsystem may, for example, be implemented using a product known as CAT-EGORIZER™, made by Inxight Software, Inc. of Santa Clara, Calif.

In one embodiment, sample-test training set generation subsystem system 430 generates a sample-test training set from an original training set by, for example, removing one or more data samples. The categorization-by-example subsystem 120 is trained with this sample-test training set, and then automatically infers coding or categorization of data samples after being thus trained.

The comparison subsystem 440 compares and records differences between the original coding of a data sample with coding generated by the categorization-by-example subsystem 420 that has been trained with the sample-test training set.

In one embodiment, the comparison subsystem 440 marks codes for category assignments that were present in the original coding, but which are absent in the coding that has been automatically inferred by the categorization-by-example subsystem 420, as "suspicious". Codes absent in the original coding but present in the automatically inferred coding may be marked as "missing".

In another example, the comparison subsystem 440 associates categories, topics or codes with an automatically inferred metric of confidence and/or metric of difference between the editorial and automatic category assignments. This example would require that the categorization-by-example subsystem 420 provide confidence metrics on a per-code basis. This example facilitates prioritized review of so-called "suspicious" and "missing" codes.

Sample recommendation outputs of the comparison subsystem 440 are as follows:

```
<?xml version='1.0' encoding=ISO8859-1'?>
<tsanalysis>
<textitem exitd='21430'>
    <suspiciousCode class='lewis:places" exitd='usa' precision=
    '0.643164'/>
    <suspiciousCode class='lewis:topic" exitd='earn' precision='0.3271'/>
</textitem>
<textitem exitd='21427'>
    <missingCode class='lewis:topic" exitd='earn' precision='0.958592'/>
</textitem>
</tsanalysis>
<?xml version="1.0" encoding="ISO8859-1"?>
<tsanalysis>
<textitem exitd='21576'>
    <suspiciousCode class='1' extid='gold' precision='0.09'/>
    <suspiciousCode class='1' extid='silver' precision='0.01'/>
</textitem>
<textitem exitd='21576'>
    <suspiciousCode class='1' extid='UK' precision='0.09'/>
    <missingCode class='1' extid='silver' precision='0.99'/>
</textitem>
</tsanalysis>
```

The following DTD provides a more detailed description of the analysis output file format:

```
<!DOCTYPE TSAnalysis[
    <!ELEMENT tsanalysis (textitem+)>
    <!ELEMENT textitem (suspiciousCode | missingCode)*>
    <!ATTLIST textitem extid CDATA #REQUIRED>
    <!ELEMENT suspiciousCode EMPTY>
    <!ATTLIST suspiciousCode
        class CDATA #REQUIRED
        extid CDATA #REQUIRED
        precision CDATA #REQUIRED>
```

-continued

```
    <!ELEMENT missingCode EMPTY>
    <!ATTLIST missingCode
        class CDATA #REQUIRED
        extid CDATA #REQUIRED
        precision CDATA #REQUIRED>
]>
```

The tags appearing in the DTD may be interpreted as follows: Tsanalysis serves as the document's root XML element and contains all the textitems with one or more suggested corrections. Textitem indicates a particular training document and contains elements suggesting corrections to the training coding.

Extid is the training document's external identifier. SuspiciousCode indicates that the containing textitem contains a code whose presence on the document is not supported by the remainder of the training set. Class is the code class of the suspicous topic code. Extid is the external identifier of the suspicious topic code. Precision is a measure corresponding to the probability that the code correctly applies based on comparison with the remainder of the training set. MissingCode indicates that the containing textitem does not contain a code whose presence on the document is supported by the remainder of the training set. Class is the code class of the missing topic code. Extid is the external identifier of the missing topic code. Precision is a measure corresponding to the probability that the code correctly applies based on comparison with the remainder of the training set.

The analysis report may serve as a guide for training set inspection. Not every recommendation in the analysis report will be correct—correctness may be left for an editor to judge. When a correct recommendation is found, the user may correct the training documents' category assignments and re-register the document in the training set. Where a recommendation proves incorrect, the user may consider adding documents to the training set to support the existing training document's category assignment.

The controller 450 processes data samples in a training set using the comparison subsystem 440 to compare the result of processing the excluded data sample using the categorization-by-example subsystem that has been trained with a sample-test training set that has been generated using sample-test training set generation subsystem.

The review/revision subsystem 460 may be used to review the coding differences recorded by the comparison subsystem. The review/revision subsystem 450 detects errors, revises erroneously coded data samples and marks appropriately coded samples in need of additional siblings. The revisions may be performed automatically based on a predetermined weighting scheme or the like, or may be based on human judgment and allow or require user input.

The memory 470 may store any programs necessary for the operation of the categorization system, may serve as a buffer for data coming from the data source 490 or going to the data sink 492, and may temporarily store data as necessary during processing. The memory 470 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like. Further, it should be appreciated that the memory 470 need not be a single physical entity shared by other components of the entire categorization subsystem. For example, one or more of the subsystems of the categorization system 400 may have its own dedicated memory.

An exemplary method for implementing the invention is given as follows

```
// Pseudocode for Training Set Analysis System
//
// This pseudocode is intended to exemplify one possible
// implementation of the training set analysis system.
//
// Syntax and semantics of this pseudocode roughly approximate
// that of C++
//
void AnalyzeTrainingSet(TrainingSet originalTS) {
// Iterate over members of the original training set
foreach (TrainingSample S in originalTS) {
// Identify the test sample and create a test training set
// without the test sample.
TrainingSets testTS;
testTS CopyFrom(originalTS);
testTS RemoveSample(S);
// Train a categorization by a example system with the
// test training set
CategorizationSystem testCategorizer;
testCategorizer.Train(testTS):
// Categorize the test sample with the testCategorizer and
// compare the automatic categorization results with the original
// categories.
Categories originalCategories = S.GetCategories( );
Categories testCategories   = testCategorizerCategorize(S.Data( ));
foreach (Category C in originalCategories) {
    if (C not in testCategories) {
        printf("Potentially incorrect category %s on sample %s\n",
            C.Name( ), S.Name( ));
    }
        }
        foreach (Category C in testCategories) {
        if (C not in originalCategories) {
            printf("Potentially missing category %s on sample
            %s\n",
                C.Name( ), S.Name( ));
        }
    }
   }
}
```

In one exemplary implementation, a program may be invoked from a command line using the syntax: tsanalysis <lxcatoptions> <minPPresent> <maxPMissing> <output file>. In this implementation, the program accepts four input parameters: lxcatoptions: the categorization model configuration file (Ixcatoptions) minPPresent: The minimum probability of correctness for codes in the training set. The program records as suspicious training document topic codes that fails to meet this threshold. For example, if the minPPresent value is 0.01, the program will record as suspicious topic code instances with less than a 1% chance of being correct. This parameter must be greater than 0. maxPMissing: The maximum probability of correctness for codes absent from the training set. The Analysis Tool records as missing training document topic codes that exceeds this threshold but has not been applied to the document. For example, if the maxPMissing value is 0.99, the Accuracy Tool will record as missing topic code instances not applied to a training document despite a 99% likelihood of being correct. This parameter must be greater than 0. output file: The file name for the Analysis Tool's report. A pair of sample outputs appear above.

Useful processes for automatic outlier detection may include fewer or more steps. One computer-assisted method of auditing a superset of training data operates on examples of documents having one or more category assignments. The superset of training data is likely to contain inaccuracies or deficiencies of the types described above. The auditing method assists in finding mistakes and deficiencies. Once data has been loaded into some kind of working memory, the superset of training data may be partitioned into at least two sets. One set is a test set and another set is a training set. The test set includes test documents and the training set includes training documents. Additional sets may be created of documents that are or are not in the test or training sets. Disjoint test and training sets are preferred, as the error introduced by comparing a test document to itself can be avoided. Alternatively, the training set may include the one or more test documents. Then, the effect of comparing a test document to itself can be filtered out by avoiding the reflexive comparison or discounting its result. The partitioning of the superset into these sets may be arbitrary or it may be guided by characteristics of the documents. In one embodiment, the test set includes only one document, which effectively increases the size of the training set. More than one document can be included in the test set, effectively reducing the number of times that training sets need to be processed, which can be useful when processing is resource intensive, for instance, when a k nearest neighbors (kNN) classification system is used. The test set may comprise a predetermined number of documents, a predetermined proportion of the superset or a group of documents left over after constructing a training set of a predetermined size or predetermined characteristics.

The partitioning of the superset may be repeated many times. To thoroughly test for outliers, the partitioning of the superset logically would result in substantially all of the documents in the superset being partitioned into a test set in one pass or the next. A less than exhaustive test may be useful for many purposes. Logical levels of testing documents in the superset include at least 10, 20, 30, 40 or 50 percent of the documents in the superset. Alternatively, a statistically significant sample could be selected based on a confidence level, a significance level (e.g., 0.05, 0.01, 0.001, etc.) or an expected error magnitude.

The training set includes examples of documents belonging to at least two categories. Categories are assigned to the documents in the superset before the test and training sets are identified. A category may be represented by a code that links the document and the category. Categories may be distinct, may overlap, may be hierarchical or in any other useful structure. In many practical situations, a plurality of categories (two, three, four, ten or even numerous categories,) is represented in the superset and the training set. Classification into more than two categories presents a more challenging problem than a two-value, accept/reject classification. The present invention is well-adapted to detect outliners when documents have been assigned to more than two categories.

The test documents are assigned to categories, that is, categorized, using the training set. The training set may be used as a basis for classification by example. It may be used to train a neural network. It may be used to generate Bayesian or naïve Bayesian probabilities for documents to belong in particular categories. Methods practicing aspects of the present invention need not be not limited to one or another type of automatic categorization.

In one particular instance, kNN techniques are applied to documents including words and phrases. Typically, the documents are represented as term vectors and the term vectors are processed. Other types of documents may be represented by vectors of other attributes, as described above. Assigning a test or probe document to a category involves identifying the k nearest neighbors of the test document and using the category assignments of those documents as examples for category assignments to be applied to the test document, in accordance with well-known techniques. A variety of measures of distance or similarity, including those described above, may be used to identify the k nearest neighbors. Alternatively, different categorization methods can be applied, such as a Support Vector Machines (SVM), a neural network (NNet), the Linear Least Squares Fit (LLSF) mapping and a Naïve Bayes (NB) classifier.

Before a test document is automatically categorized and one or more category assignments result, the test document begins with one or more original category assignments, which may have been editorially generated by humans. When a test document has been automatically categorized, based on the training set, it is associated with one or more category assignments that it had. Sometimes, the automatic and editorial category assignments match. The difference between the classification result and the original assignment may be zero. Other times, there is a mismatch between the original categorization and the automatic categorization. In either case, a metric of confidence for results of the categorizing step and the original category assignments for the test documents may be calculated. Virtually any metric can be applied.

One metric of confidence is to compare category assignments based on automatic and editorial categorization. Each mismatch can be taken as a suspicious or missing category assignment. Suspicious category assignments would be editorial assignments that lack a corresponding automatic assignment. Missing category assignments would be automatic category assignments that do not appear among the corresponding editorial category assignments. Another metric of confidence is developed below.

For a set D of document feature vectors, representing documents, $$D = \{d_1, \ldots, d_i\} \tag{1.1}$$

and a set of category assignments C over topics T, $$C = \{T_1, T_2, \ldots, _l\} \tag{1.2}$$

the topics $T_t$ being associated with sets of document feature vectors $$T_t = \{d_{i1}, \ldots, d_{ij} : d_{ik} \in D\} \tag{1.3}$$

we can find the nearest neighbors to a test or probe document, represented by the document feature vector $d_t$ $$K(d_t) = \min_{d_i \in D} {}_K s(d_t, d_i) \tag{1.4}$$

by applying the scoring function, s, which represents the nearness or distance of two document feature vectors.

The nearest neighbors to the probe document have one or more topic assignments $T_j$. The category scores of the topics can then be calculated for the probe document in at least two ways:

$$\Omega_0(d_t, T_m) = \sum_{d \in \{K(d_t) \cap T_m\}} s(d_t, d), \text{ or:} \tag{0.1}$$

$$\Omega_1(d_t, T_m) = \frac{\sum_{d_1 \in \{K(d_t) \cap T_m\}} s(d_t, d_1)}{\sum_{d_2 \in K(d_t)} s(d_t, d_2)} \tag{0.2}$$

Figure 5A:
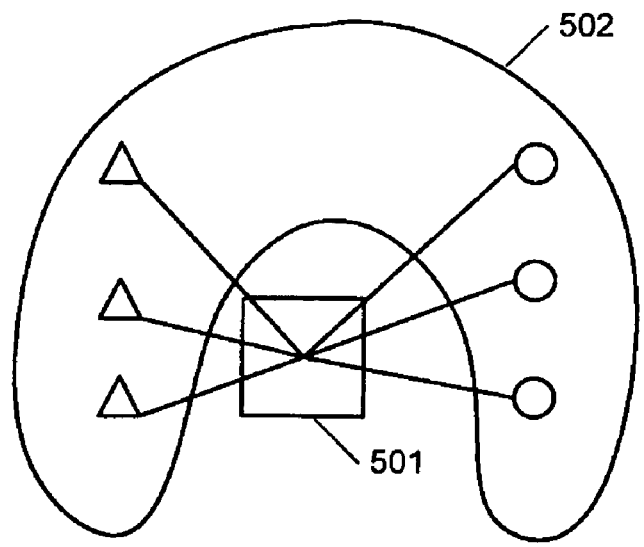
FIGS. 5A–B depict the effect of normalizing category scores.
Figure 5B:
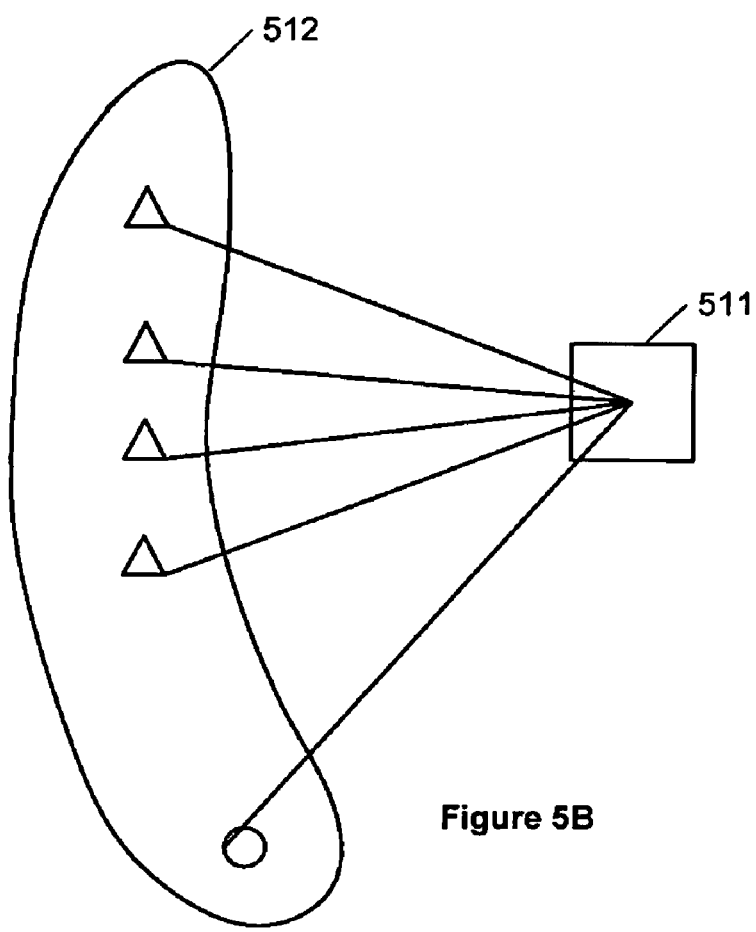

The first formula calculates the sum $\Omega_1$ of the contributions or evidence that probe document $d_t$ should receive topic assignment $T_m$, while the second calculates the normalized sum $\Omega_2$, normalized to reflect the density of the neighborhood of the probe document. These formulas may be modified to reflect the number of documents among the nearest neighbors that share the topic assignment $T_m$. FIGS. 5A–B illustrate the significance of normalizing scores. In these figures, the triangles and circles represent documents having first and second categorizations, respectively. The density of the neighborhood around the test document which is represented by the larger square, is indicated by the distance between the test document and its neighbors. An ambiguous situation, as in FIG. 5A, may appear to strongly support a topic assignment, because the neighborhood 502 of the test document 501 is dense. An unambiguous situation, as in FIG. 5B, may seem to weekly support a topic assignment, unless a normalized metric of confidence is used, because the neighborhood 512 of the test document 511 is less dense.

The final step in the categorization process involves determining whether the category scores, $\Omega$, justify assignment of the category to the probe document. This process involves setting thresholds for $\Omega$. The thresholds may be tuned using the topic assignments, $T_j$, and calculating the category scores that trade off precision and recall according a series of parameters. One procedure for tuning thresholds involves calculating the category scores for each of the training set documents. From these scores, proceeding in ranked order of scores, it is possible to calculate what score threshold would exclude or reduce the frequency of incorrect documents while maximizing the correct document assignments based on the training set. This is the trade-off of precision and recall. The set A of documents that contain a given topic assignment $T_j$ in their nearest neighbor set will be:

$$A(T_i) = \{d_{i1}, \ldots, d_{ij} : d_{ik} \in D\} \tag{1.7}$$

Specifically, we can calculate the precision p for a topic assignment $T_j$, at N documents, as:

$$p_{T_J}(N) = \frac{|\{AA_N \subseteq A(T_J)\} \cap T_J|}{N} \tag{1.8}$$

where $\{AA_N \subseteq A(T_j)\}$ is the first N neighbor's topics. In other words, the precision for topic $T_j$ at N documents is the number of documents correctly assigned to topic $T_j$ from the neighborhood sets of all the training documents divided by the number of documents we've seen thus-far. Likewise, we can calculate the recall as the number of documents correctly assigned at N over the total number of documents in the topic assignments:

$$r_{T_J}(N) = \frac{|\{AA_N \subseteq A(T_J)\} \cap T_J|}{|T_J|} \quad (1.9)$$

Now, we want to use the precision and recall scores to set the thresholds. To do so, we can set the minimum combined similarity score (1.5) required for a new document to be a member of a category to be equal to the score that admits enough of the training set documents to achieve the desired precision score. For example, if we want to be very precise in our category assignments, we can choose a combined similarity score that admits only the top two training set documents that are correctly assigned to the category.

We can also set the precision and recall thresholds by use of a parameter that trades off these two factors. Specifically, given $\beta_H > 1 > \beta_L$, where, for either $\beta$ we can calculate an F-score:

$$F = \frac{(\beta^2 + 1)pr}{\beta^2 p + r} \quad (1.10)$$

So $\beta = 1.0$ makes precision and recall equally valuable, while lower $\beta_L$ leads to increased impact of precision in denominator. Values of $\beta_H$ higher than 1.0 increase the impact of recall in setting the score threshold. With higher recall, more documents will be assigned to a category at the expense of precision.

We can also calculate the probability of a given document in $AT(T_J)$ being an outlier by crafting a similar threshold policy based on incorrect assignments. Specifically, we formulate the "warning precision" at N as $$w_{T_J}(N) = 1 - \frac{N-1}{|A(T_J)|} \quad (1.11)$$

Given this warning precision, we will warn the user that a document might be improperly assigned if it is assigned to this category and the warning precision is less than a threshold. In other words, if the document is assigned to the category but has a very low precision, it may be incorrectly assigned. Similarly, if the document's precision is very high and it is not assigned to this category, it may be a missing document for this category.

Other metrics of confidence or difference can be used for determining the membership in these "warning" and "missing" groups. For example, if we examine the nearest neighborhood set based on the entropy of the neighborhood. The entropy of a neighborhood is a measure of the uniformity of the probabilities of the category appearing in the neighborhood. For our neighborhoods, the entropy is:

$$H(A(T_J)) = -\sum_J \frac{1}{P(d \in A(T_J))} \log\left(\frac{1}{P(d \in A(T_J))}\right) \quad (1.12)$$

Where the probabilities can be reduced to the ratio of the counts of each code in $A(T_J)$. With this so-called measure of confidence, the categories that have high entropy are the categories that in turn have many documents that are also assigned to other categories. This measure can in turn prioritize the examination of categories for editorial review.

Based on the metric of confidence, the test documents and category assignments that are suspicious and that appear to be missing are reported. The report may be a printed report (e.g., to paper or computer output microfilm) or pseudo-printed report (e.g., to a portable document format, a database or print viewer,) or a tagged or delimited field format (e.g., XML or CSV). In the report, a filter may be applied to the test documents and/or category assignments, based on the metric of confidence. The filter may be used to reduce the number of documents and/or category assignments displayed to a user or auditor. Alternatively, it may be used to color-code the category assignments using a red-yellow-green scheme or any other color coding scheme that makes the reported data more readily accessible to the user or auditor.

An additional embodiment of the present invention is adapted at least to the kNN categorization environment. In this embodiment, partitioning the superset of training documents is optional. The training documents include previously set assignments to one or more categories. The superset includes examples of documents assigned to a plurality of categories, for instance three or more categories, as explained above. In this method, the k nearest neighbors of the training documents are determined. Doing this does not require partitioning of the superset, unless a reduced set size is desired. The training documents are categorized using the k nearest neighbors. If lists of the k nearest neighbors are kept, more than one set of k nearest neighbors can be determined prior to categorizing the documents; the steps of this method can be carried out in various orders to the same result, as in prior embodiments. A metric of confidence can be calculated, with the original and automatic category assignments available, as in the prior embodiment. A report of documents and category assignments that are suspicious and that appear to be missing can be generated, based on the metric of confidence, again as in the prior embodiment.

Further embodiments are adapted to methods that assign a document to one or more categories. For instance, the present invention is well-adapted to use with categorization strategies including Support Vector Machines (SVM), a neural network (NNet) approach, the Linear Least-squares Fit (LLSF) or the Naïve Bayes (NB) classifier.

While the preceding examples are cast in terms of a method, devices and systems employing this method are easily understood. A magnetic memory containing program logic practicing the claimed method is one such device. A computer system having memory loaded with program logic practicing the claimed method is another such device.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. A computer assisted method of auditing a superset of training data, the superset comprising examples of documents having one or more preexisting category assignments, the method including:

partitioning the superset into at least two disjoint sets, including a test set and a training set, wherein the test set includes one or more test documents and the training set includes examples of documents belonging to at least two categories;

automatically categorizing the test documents using the training set;

calculating a metric of confidence based on results of the categorizing step and comparing the automatic category assignments for the test documents to the preexisting category assignments; and reporting the test documents and preexisting category assignments that are suspicious and the automatic category assignments that appear to be missing from the test documents, based on the metric of confidence.

2. The method of claim 1, further including repeating the partitioning, categorizing and calculating steps until at least one-half of the documents in the superset have been assigned to the test set.

3. The method of claim 2, wherein the test set created in the partition step has a single test document.

4. The method of claim 2, wherein the test set created in the partition step has a plurality of test documents.

5. The method of claim 1, further including repeating the partitioning, categorizing and calculating steps until more than 50 percent of the documents in the superset have been assigned to the test set.

6. The method of claim 5, wherein the partitioning, categorizing and calculating steps are carried out automatically.

7. The method of claim 5, wherein the partitioning, categorizing, calculating and reporting steps are carried out automatically.

8. The method of claim 1, wherein the partitioning, categorizing and calculating steps are carried out automatically.

9. The method of claim 1, wherein the partitioning, categorizing, calculating and reporting steps are carried out automatically.

10. The method of claim 1, wherein the categorizing step includes determining k nearest neighbors of the test documents and the calculating step is based on a k nearest neighbors categorization logic.

11. The method of claim 10, wherein the metric of confidence is an unweighted measure of distance between a particular test document and the examples of documents belonging to various categories.

12. The method of claim 11, where the unweighted measure includes application of a relationship $$\Omega_0(d_t, T_m) = \sum_{d \in \{K(d_t) \cap T_m\}} s(d_t, d),$$

wherein $\Omega_0$ is a function of the particular test document represented by the a feature vector $d_t$ and of various categories $T_m$; and s is a metric of distance between the particular test document feature vector $d_t$ and certain sample documents represented by feature vectors d, the certain sample documents being among a set of k nearest neighbors of the particular test document having category assignments to the various categories $T_m$.

13. The method of claim 10, wherein the metric of confidence is a weighted measure of distance between a particular test document and the examples of documents belonging to various categories, the weighted measure taking into account the density of a neighborhood of the test document.

14. The method of claim 13, wherein the weighted measure includes application of a relationship $$\Omega_1(d_t, T_m) = \frac{\sum_{d_1 \in \{K(d_t) \cap T_m\}} s(d_t, d_1)}{\sum_{d_2 \in K(d_t)} s(d_t, d_2)},$$

wherein $\Omega_1$ is a function of the test document represented by the a feature vector $d_t$ and of various categories $T_m$; and s is a metric of distance between the test document feature vector $d_t$ and certain sample documents represented by feature vectors $d_1$ and $d_2$, the certain sample documents $d_1$ being among a set of k nearest neighbors of the test document having category assignments to the various categories $T_m$ and the certain sample documents $d_2$ being among a set of k nearest neighbors of the test document.

15. The method of claim 1, wherein the reporting step further includes filtering the reported test documents based on the metric of confidence.

16. The method of claim 15, wherein filtering further includes color coding the reported test documents based on the metric of confidence.

17. The method of claim 15, wherein filtering further includes selecting for display the reported test documents based on the metric of confidence.

18. The method of claim 1, wherein reporting includes generating a printed report.

19. The method of claim 1, wherein reporting includes generating a file conforming to XML syntax.

20. The method of claim 1, wherein reporting includes generating a sorted display identifying at least a portion of the test documents.

21. The method of claim 1, further including calculating a precision score for the reported test documents.

22. A computer assisted method of auditing a superset of training data, the superset comprising examples of documents having one or more preexisting category assignments, the method including:

determining k nearest neighbors of the documents in a test subset automatically partitioned from the superset;

automatically categorizing the documents based on the k nearest neighbors into a plurality of categories;

calculating a metric of confidence based on results of the categorizing step and comparing the automatic category assignments for the documents to the preexisting category assignments; and reporting the documents in the test subset and preexisting category assignments that are suspicious and the automatic category assignments that appear to be missing from the documents in the test subset, based on the metric of confidence.

23. The method of claim 22, wherein the metric of confidence is an unweighted measure of distance between a particular test document and the examples of documents belonging to various categories.

24. The method of claim 23, where the unweighted measure includes application of a relationship $$\Omega_0(d_t, T_m) = \sum_{d \in \{K(d_t) \cap T_m\}} s(d_t, d),$$

wherein $\Omega_0$ is a function of the test document represented by the a feature vector $d_t$ and of various categories $T_m$; and s is a metric of distance between the test document feature vector $d_t$ and certain sample documents represented by feature vectors d, the certain sample documents being among a set of k nearest neighbors of the test document having category assignments to the various categories $T_m$.

25. The method of claim 22, wherein the metric of confidence is a weighted measure of distance between a particular test document and the examples of documents belonging to various categories, the weighted measure taking into account the density of a neighborhood of the test document.

26. The method of claim 25, wherein the weighted measure includes application of a relationship $$\Omega_1(d_t, T_m) = \frac{\sum_{d_1 \in \{K(d_t) \cap T_m\}} s(d_t, d_1)}{\sum_{d_2 \in K(d_t)} s(d_t, d_2)},$$

wherein $\Omega_1$ is a function of the test document represented by the a feature vector $d_t$ and of various categories $T_m$; and s is a metric of distance between the test document feature vector $d_t$ and certain sample documents represented by feature vectors $d_1$ and $d_2$, the certain sample documents $d_1$ being among a set of k nearest neighbors of the test document having category assignments to the various categories $T_m$ and the certain sample documents $d_2$ being among a set of k nearest neighbors of the test document.

27. The method of claim 22, wherein the determining, categorizing and calculating steps are carried out automatically.

28. The method of claim 22, wherein the reporting step further includes filtering the documents based on the metric of confidence.

29. The method of claim 28, wherein the filtering step further includes color coding the reported documents based on the metric of confidence.

30. The method of claim 28, wherein the filtering step further includes selecting for display the reported documents based on the metric of confidence.

31. The method of claim 22, wherein reporting includes generating a printed report.

32. The method of claim 22, wherein reporting includes generating a file conforming to XML syntax.

33. The method of claim 22, wherein reporting includes generating a sorted display identifying at least a portion of the documents.

34. The method of claim 22, further including calculating a precision score for the reported documents.

* * * * *